Figure 9:
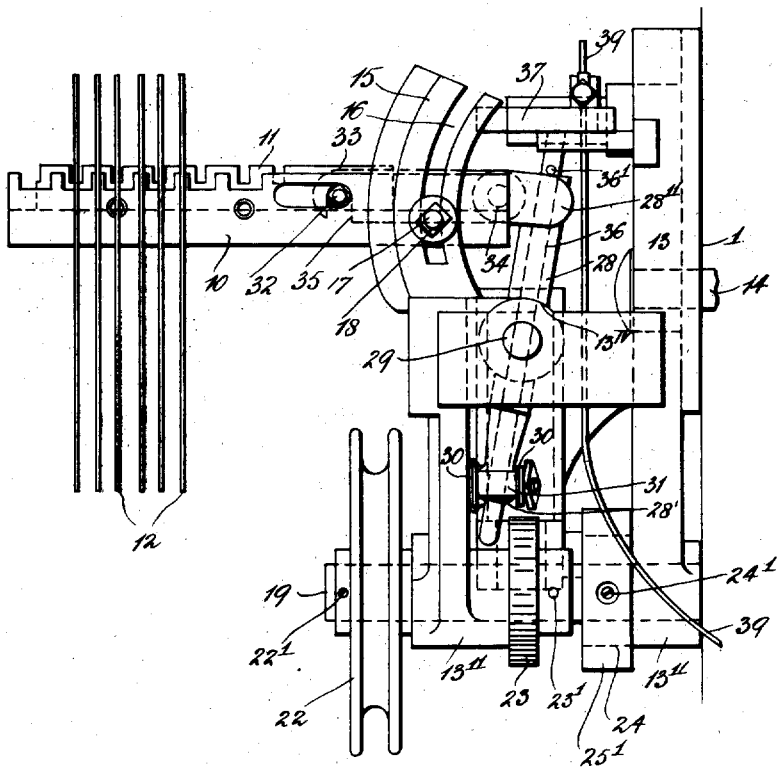

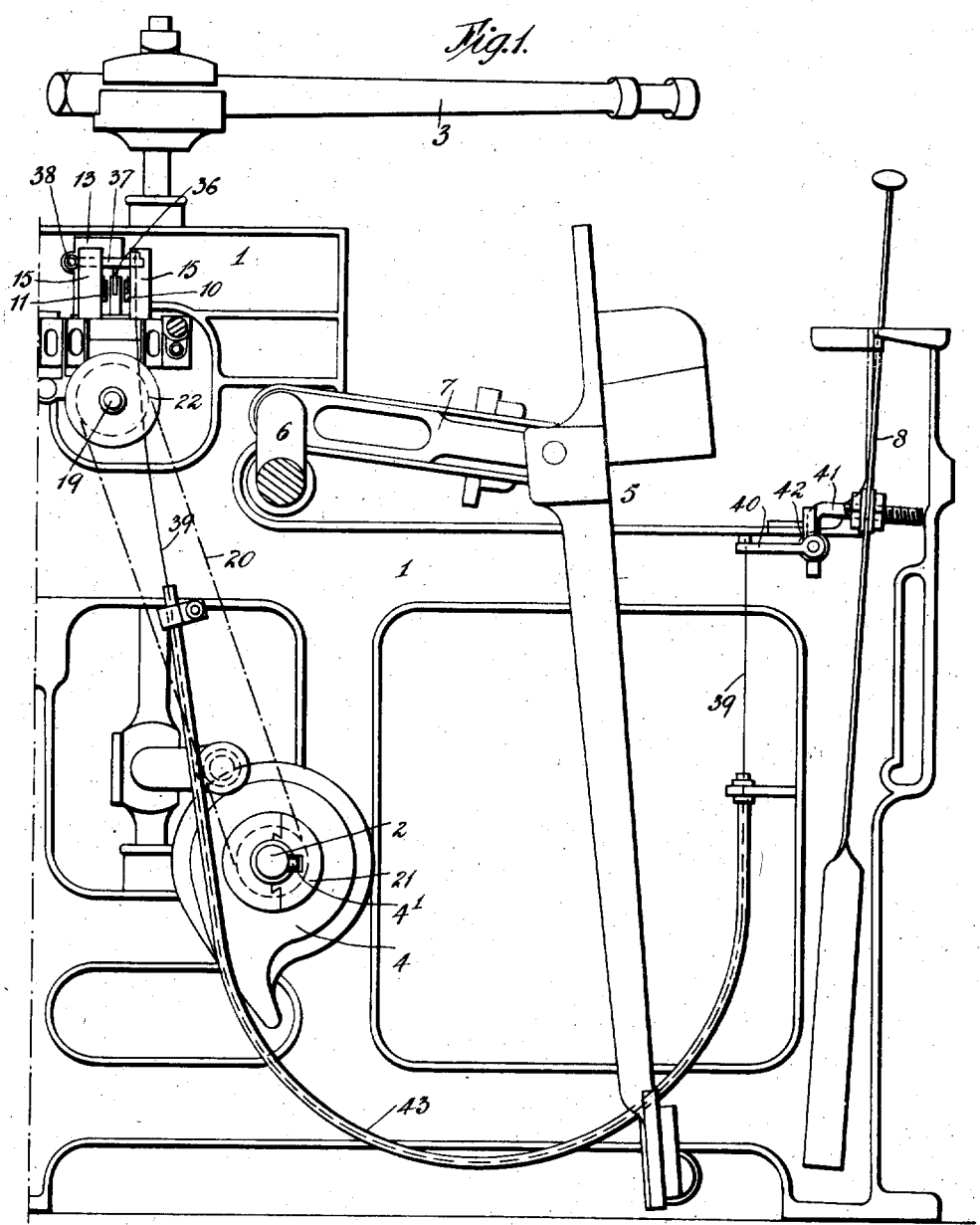

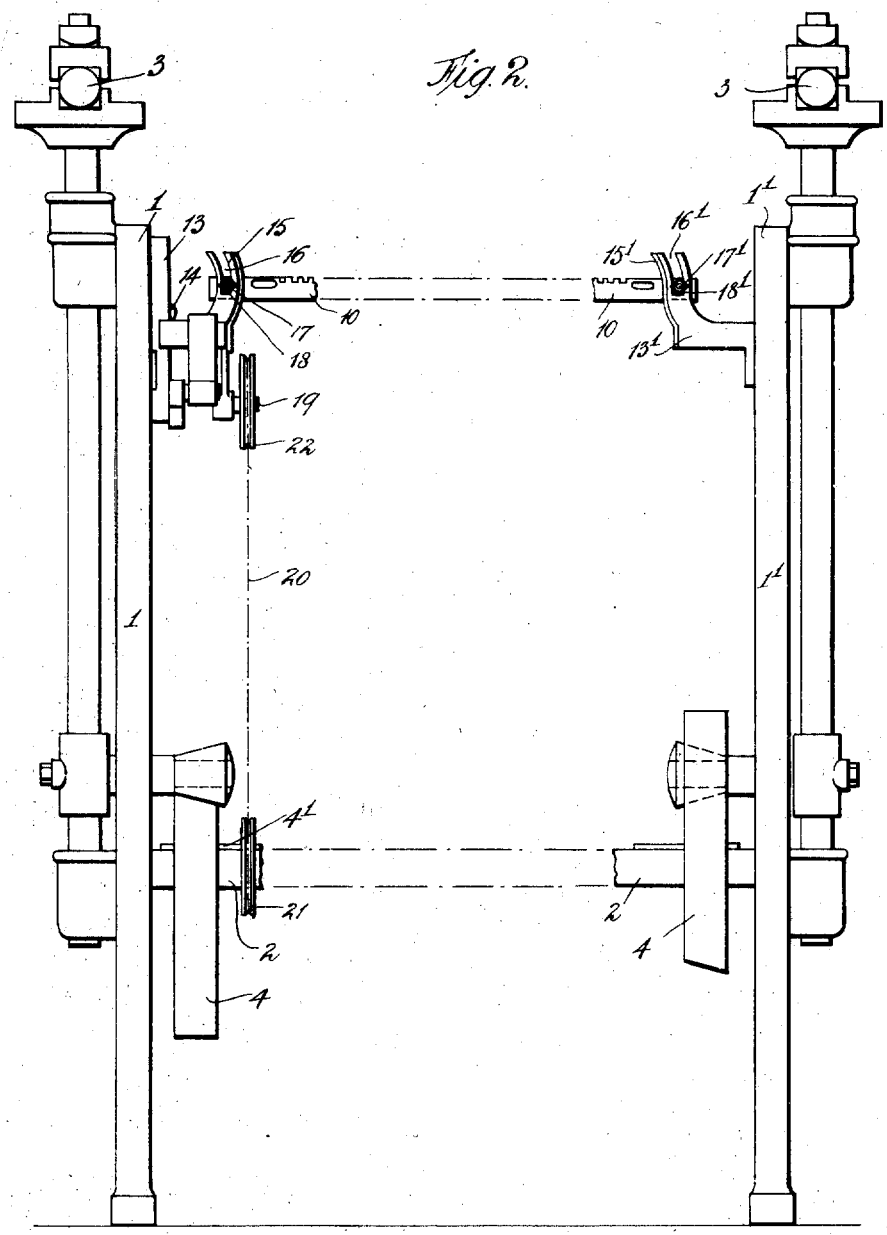

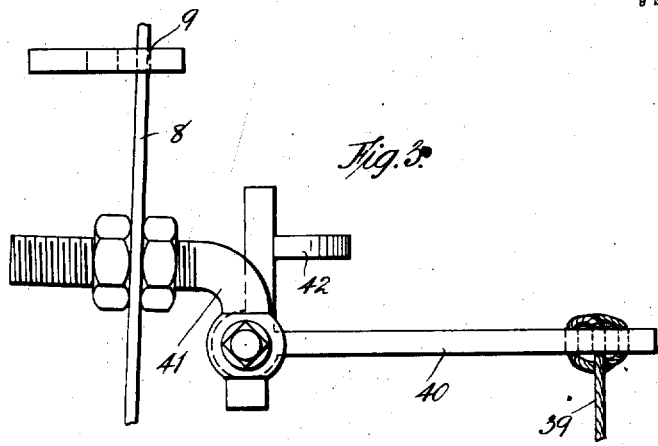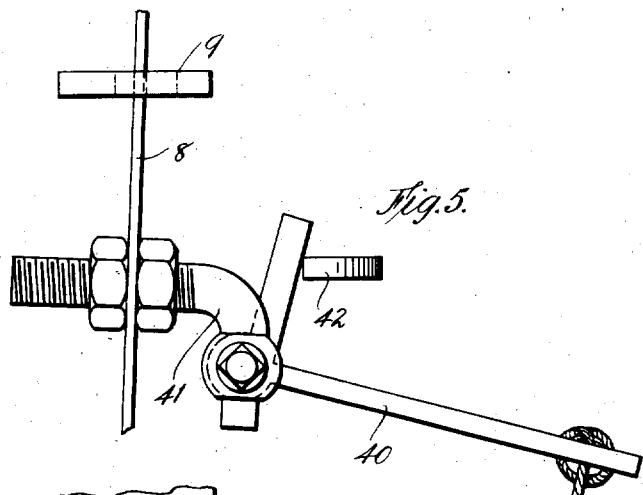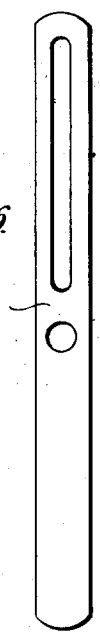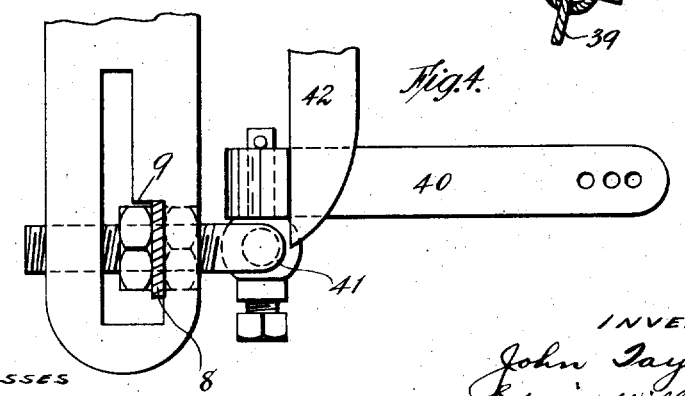

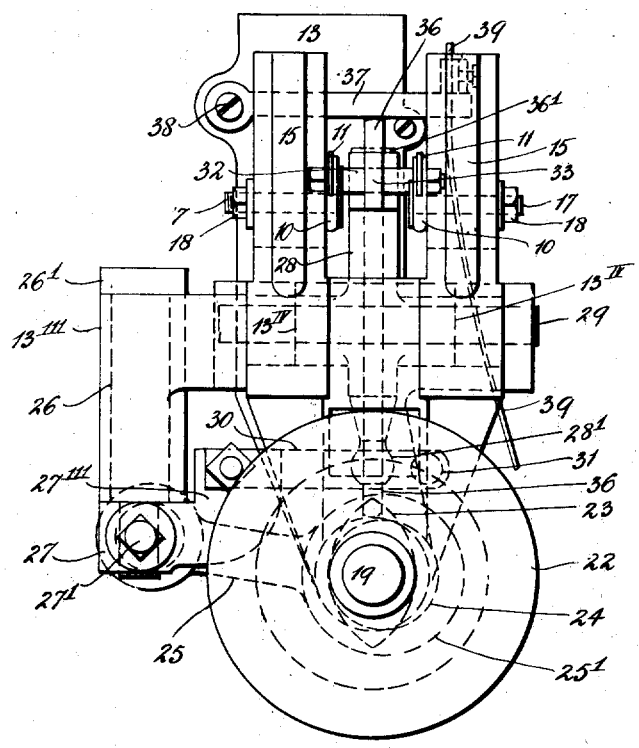

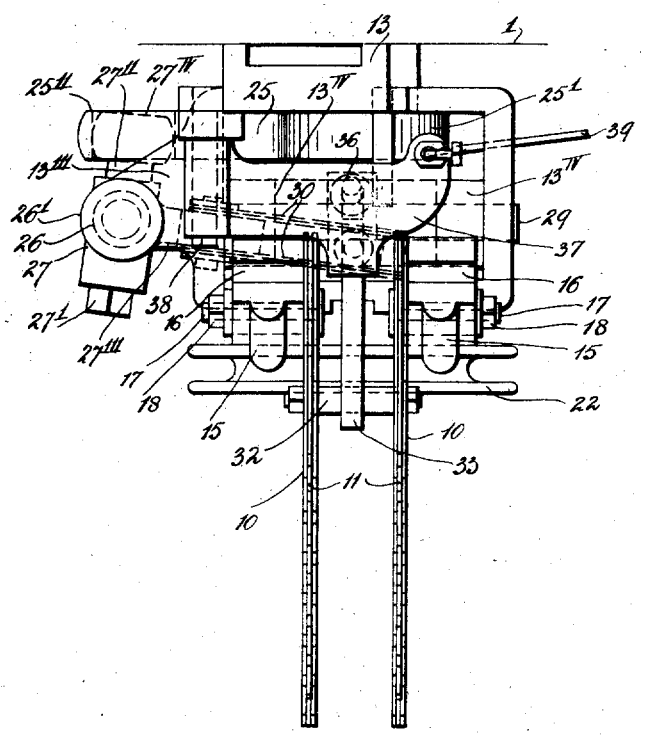

No. 897,429. PATENTED SEPT. 1, 1908.
J. TAYLOR & E. W. BUCKLEY.
MECHANICAL WARP STOP MOTION FOR WEAVING LOOMS, WARPING MACHINES, AND THE LIKE.
APPLICATION FILED NOV. 4, 1907.

9 SHEETS—SHEET 6.

No. 897,429. PATENTED SEPT. 1, 1908.
J. TAYLOR & E. W. BUCKLEY.
MECHANICAL WARP STOP MOTION FOR WEAVING LOOMS, WARPING MACHINES, AND THE LIKE.
APPLICATION FILED NOV. 4, 1907.

9 SHEETS—SHEET 7.

WITNESSES
W. P. Burke
M. Pettit

INVENTORS
John Taylor
Edwin William Buckley

No. 897,429. PATENTED SEPT. 1, 1908.
J. TAYLOR & E. W. BUCKLEY.
MECHANICAL WARP STOP MOTION FOR WEAVING LOOMS, WARPING MACHINES, AND THE LIKE.
APPLICATION FILED NOV. 4, 1907.

9 SHEETS—SHEET 8.

WITNESSES
W. P. Burke
[signature]

INVENTORS
John Taylor
Edwin William Buckley
BY [signature] ATTY

No. 897,429. PATENTED SEPT. 1, 1908.
J. TAYLOR & E. W. BUCKLEY.
MECHANICAL WARP STOP MOTION FOR WEAVING LOOMS, WARPING MACHINES, AND THE LIKE.
APPLICATION FILED NOV. 4, 1907.

9 SHEETS—SHEET 9.

UNITED STATES PATENT OFFICE.

JOHN TAYLOR AND EDWIN WILLIAM BUCKLEY, OF NEWTON HEATH, MANCHESTER, ENGLAND.

MECHANICAL WARP STOP-MOTION FOR WEAVING-LOOMS, WARPING-MACHINES, AND THE LIKE.

No. 897,429.      Specification of Letters Patent.      Patented Sept. 1, 1908.

Application filed November 4, 1907. Serial No. 400,634.

*To all whom it may concern:*

Be it known that we, JOHN TAYLOR and EDWIN WILLIAM BUCKLEY, subjects of the King of Great Britain and Ireland, residing at Newton Heath, Manchester, in the county of Lancashire, England, have invented new and useful Improvements in Mechanical Warp Stop-Motions for Weaving-Looms, Warping-Machines, and the Like, of which the following is a specification.

This invention has for its object improvements in mechanical warp stop motions for weaving looms, warping machines and the like, and relates to that type of such motions in which drops consisting of metal strips are used in conjunction with a fixed notched or serrated drop bar and a second similar bar or inset which is movable in relation to the fixed drop bar, the fall of a drop causing the two bars to be locked together and thereupon the motion of the loom to be stopped through connecting mechanism.

The present invention has been designed with the object of so constructing a warp stop motion of the above described type that it shall occupy only a small space and contain but few parts, shall be simple, more easily adjustable and less liable to wear, shall be independent of any of the so-called going or reciprocating parts of the loom, such as the lay and its sword, shall enable a flexible connection between itself and the shipper or knock-off lever to be used in place of a series of levers, and by reason of it being self-contained shall be capable of being readily attached to and removed from a loom, of almost any description, without alteration in any of its main parts.

In addition to the foregoing advantages our invention will be found to have especial value in the case of warp stop motions for looms in which, owing to the fineness of the counts of warp used, a large number of drops and several drop bars are rendered necessary, as additional bars may be added with facility.

According to our invention we so arrange the operative parts of our warp stop motion that, while they are independent of the lay and its sword and other reciprocating parts of the loom, a part carried by or connected to a rocking lever or other means actuating the movable serrated bar or inset shall during the normal running of the loom be so timed as to miss a constantly moving actuator, but upon the movement of said serrated bar or inset being arrested by the fall of a drop the part carried by or connected to said rocking lever or the like shall come within the path of said constantly moving actuator, be moved thereby and so cause disengagement of the shipper lever from its retaining notch.

The preferred construction of the motion is shown by the accompanying drawings, in which:—

Figure 10:
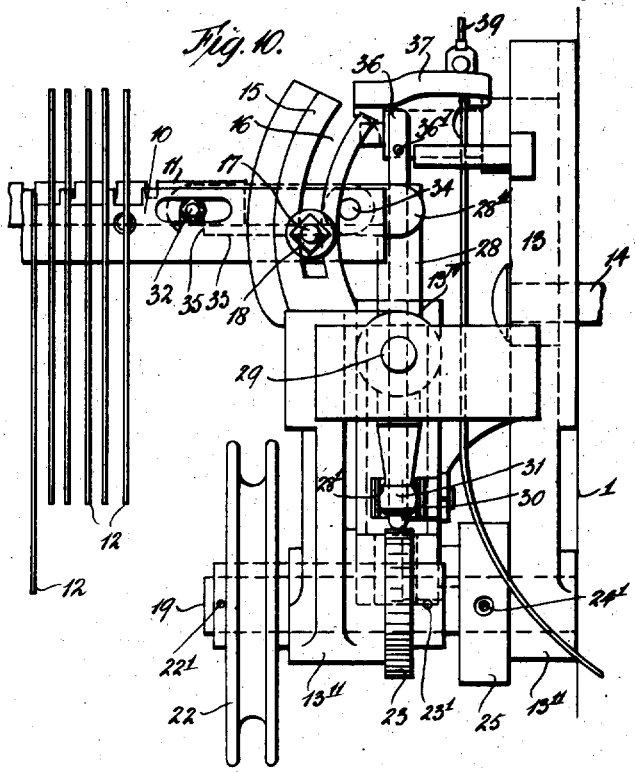
Figure 11:
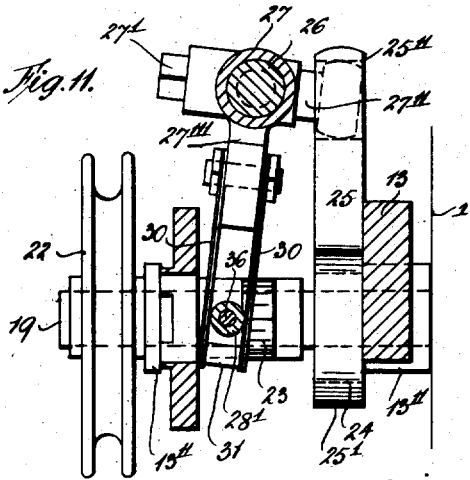
Figure 12:
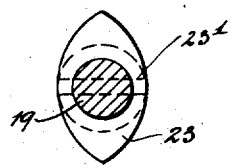
Figure 13:
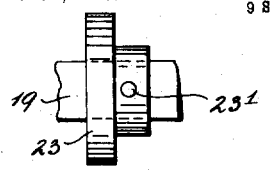
Figures 14, 15:
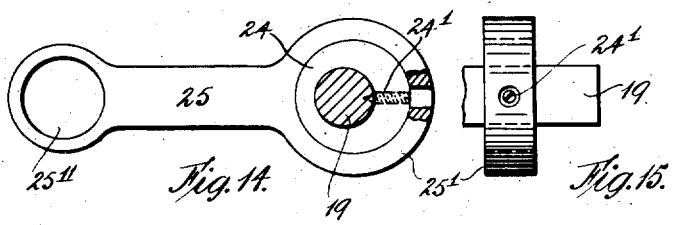
Figure 16:
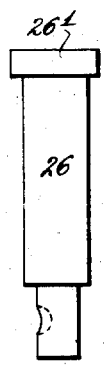
Figure 17:
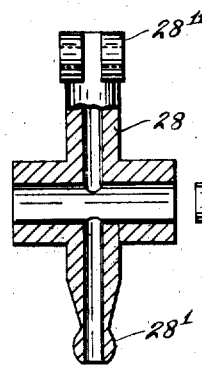
Figure 18:
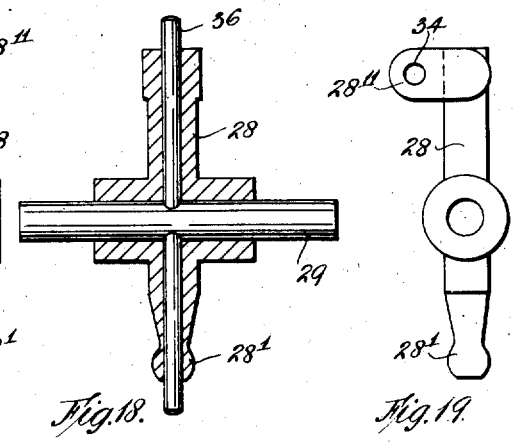
Figure 19:
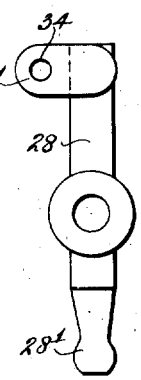
Figure 20:
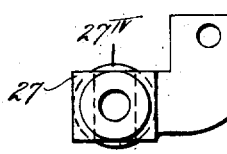
Figure 21:
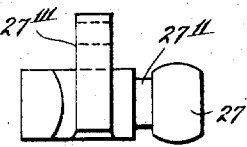
Figure 22:
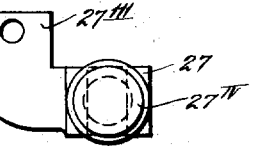
Figure 23:
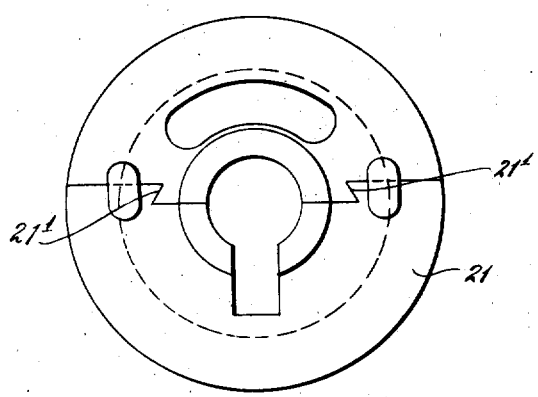
Figure 24:
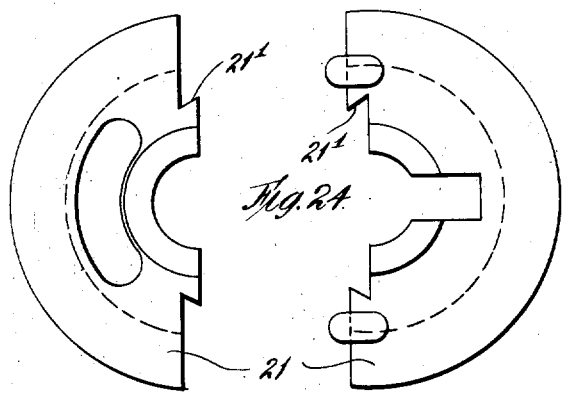

Figure 1 is a side elevation of a portion of one of the side frames of a loom and showing the application of the invention, parts of the loom being omitted for the sake of clearness. Fig. 2 is a front elevation of the two side frames of a loom, illustrating how the drop bars are supported at the side of the loom opposite to that to which the motion is secured. Figs. 3, 4 and 5 are views of a portion of the shipper lever and means for releasing said lever from its retaining notch. Fig. 6 is a view of one form of drop that may be employed. Figs. 7 to 11 are views of the motion proper, on an enlarged scale; Figs. 7 and 8 being an end elevation and plan viewed from above, Figs. 9 and 10 illustrating respectively the normal operation of the motion and the positions of the parts of the motion when the shipper lever is being released, and Fig. 11 a sectional plan showing more clearly certain details of construction. Figs. 12 and 13 are views of the constantly moving actuator or cam. Figs. 14 and 15 are views of a connecting rod and an eccentric upon which said connecting rod is mounted. Fig. 16 is a view of a rock shaft. Figs. 17, 18 and 19 are views of the normally moving part or rocking lever. Figs. 20, 21 and 22 are views of a piece which is clamped to the rock shaft and serves as a means for transferring to said rock shaft the movement transmitted by the above named connecting rod and eccentric. Figs. 23 and 24 are views of a divided pulley for use with the present invention.

In these drawings, 1, 1' are the side frames of the loom, 2 is the cam shaft, 3 are the picking sticks, 4 are cams for operating said picking sticks, 5 is the lay receiving its motion from the crank 6 and connecting rod 7, 8 is the shipper lever and 9 is the retaining notch for same, all of these parts being of well-known construction.

10 are the fixed serrated drop bars, 11 are the movable serrated drop bars or insets and 12 are the drops, these parts being common to the hereinbefore mentioned type of stop motion.

In carrying out the present invention we employ a frame or casting 13, which is so constructed as to support all the chief parts of the motion proper and to be readily attached to one of the side frames 1 of the loom by one or more bolts 14.

15 are curved horns on the inner side of the casting 13 which are formed with slots 16.

17 are screwed pins which pass through the fixed serrated drop bars 10 and through the slots 16 in the horns 15, and 18 are nuts on the outer ends of the pins 17.

13', Fig. 2, is a bracket secured to the other side frame 1' of the loom and formed with horns 15' and slots 16' similar to 15 and 16.

17' are screwed pins passing through the other end of the fixed drop bars 10 and the slots 16', and 18' are nuts on the screwed pins 17'. By means of said horns, slots, pins and nuts the serrated bars 10 and their insets 11 can be adjusted and secured in position without having to alter the position of the castings 13, 13', or interfere with the means by which the motion is driven.

19 is a horizontal shaft which is supported within bosses 13'' at the lower part of the casting 13, and is driven from the cam shaft 2 of the loom by means of a rope, belt or chain 20 and pulleys 21 and 22.

23 is a constantly moving actuator, which is mounted on the horizontal shaft 19 and preferably consists of a cam of the shape shown by Figs. 12 and 13. As will be seen from an inspection of Figs. 9, 10 and 11 the pulley 22 and the cam or actuator 23 bear against the sides of the innermost of the bosses 13'' and the horizontal shaft 19, which consists of a plain spindle, is secured in position after it has been passed through the pulley 22, and the cam or actuator 23 and the bosses 13'' by means of the screw 22' and the pin 23' by which said pulley and cam are fixed to the horizontal shaft 19. The horizontal shaft 19 is provided with an eccentric 24 upon which is mounted the enlarged end 25' of a connecting rod 25. The eccentric 24 is preferably formed separate from the horizontal shaft 19 and is secured thereto by a screw 24', as shown in Figs. 14 and 15.

26 is a vertical rock shaft which is supported within a boss 13''' of the casting 13. The rock shaft 26, which is shown separately in Fig. 16, preferably consists of a pin which is formed at its upper end with a head 26' and is secured in position within said boss 13''' by means of a pin 27 and clamping screw 27'. The piece 27, which is shown separately in Figs. 20, 21 and 22 is formed with two projections or arms 27'' and 27'''. The arm 27'' terminates in a curved head 27$^{IV}$ which snugly fits within an orifice 25'' in the outer or smaller end of the connecting rod 25, this construction of head and orifice forming a species of ball and socket joint by means of which the movement imparted to the connecting rod 25 by the eccentric 24 is transferred to the rock shaft 26. The movement so imparted to the rock shaft 26 is transmitted to a normally moving part. Said normally moving part preferably consists of a rocking lever 28 which is mounted on a spindle 29 supported in lugs 13$^{IV}$ on the casting 13. The arm or projection 27''' of the piece 27 is somewhat yieldingly connected to the lower end of the rocking lever 28 by means of two flexible arms 30, consisting of superposed thin metal strips, which bear on a spherical swell 28' at the lower end of the rocking lever 28 and are secured at their inner ends to said projection 27''' and at their outer ends by a distance piece 31. The upper end of the rocking lever 28 is detachably connected to a pin 32 fixed to the movable serrated inset, bar or bars 11 by any suitable device such as a latch 33 pivoted at 34 to lugs 28'' on the upper part of the rocking lever 28. The latch 33 is provided at its front end with an open slot 35 which is passed over the pin 32, this arrangement of pin and pivoted latch enabling the movable serrated bar or bars 11 to be readily disconnected when required from the moving parts of the motion and the latter to be so rendered inoperative.

Any suitable number of movable serrated bars or insets may be connected together by a single pin, such as 32, and be operated from a common rocking lever. The rocking lever 28 is provided with a sliding rod 36, which projects at its lower end into the path of the actuator 23 and is located at its upper end below a plate or lever 37 pivoted at 38 to the casting 13.

For the purpose of simplicity of construction and of facilitating the mounting of the rocking lever 28 within the casting 13, the sides of the rocking lever fit, as shown in Figs. 7 and 8, closely against the lugs 13$^{IV}$ and the rocking lever 28 is secured in position within the casting 13 and fixed to the spindle 29 by passing the sliding rod 36 through said spindle, as clearly shown in Figs. 7, 9, 10 and 18, downward movement of the sliding rod 36 being limited by a pin 36'. The pivoted plate or lever 37 is connected by means of a wire or other flexible medium 39 to a tripping device adapted to release the shipper lever 8 from its retaining notch 9. The preferred form of tripping device is that shown by Figs. 3, 4 and 5. Said tripping device consists of a bell-crank lever 40 which is pivoted to a bracket 41 carried by the shipper lever 8 and bears at its upper end against a fixed abutment 42. The wire or flexible medium 39 is guided by any suitable means, preferably by a tube 43. The movements of the actuator 23 and the other parts of the motion are so timed that during the normal running of the loom the sliding rod 36 is not raised by said actuator.

A motion constructed as above described can be applied without alteration of its parts to what are known in the trade as right-handed and left-handed looms.

The operation of the motion is as follows: When from any cause a drop falls on to its fixed drop bar and into the notches or serrations in the fixed and movable drop bars the travel of the movable bar or bars and rocking lever is arrested, and as the horizontal shaft and vertical rock shaft continue to move the actuator on the former will come into contact with the sliding rod carried by the rocking lever, will raise same and through the flexible connection disengage the shipper lever from its retaining notch and stop the loom, the yielding connection between the vertical rock shaft and the lower end of the rocking lever permitting the former to move and the latter to remain stationary with its sliding rod in the path of the actuator on the horizontal shaft.

With a view to facilitating the mounting of the driving pulley 21 on the cam shaft 2 and its removal therefrom and to avoid interference with the arrangement of other parts of the loom said pulley is constructed, as shown in Figs. 23 and 24, in two halves which are connected together by a dovetailed joint 21' or equivalent device, so that said halves may be readily locked together and mounted and slid on said shaft, the two halves of the pulley 21 being held together by the rope, belt or chain 20. The pulley 21 is somewhat loosely mounted on the cam shaft 2 and is driven, by the ordinary long key 4' which secures one of the picking cams 4 and projects beyond same. The above described construction of split pulley 21 enables the pulley not only to be easily mounted on the cam shaft 2 but also to be slid along same or removed therefrom, when the key 4' can be easily removed for the purpose of adjusting said cam 4.

Having now described our invention what we claim as new and wish to secure by Letters Patent is:—

1. In a mechanical warp stop motion for weaving looms and the like comprising drops and fixed and movable serrated drop bars supported at each side of the loom arranging and constructing the operative parts of the motion in such manner that said parts are contained within, and the serrated drop bars supported at one end by, a single casting or framing adapted to be readily clamped to, adjusted on and removed from the framing of the loom, substantially as described.

2. In a mechanical warp stop motion for weaving looms and the like, the combination of a casting or framing adapted to be readily clamped to, adjusted on and removed from the framing of the loom and containing the normally moving parts of the motion proper, a pivoted plate or lever operated by said motion on the fall of a drop, a shipper device and a flexible connection between said lever and the shipper device, substantially as described.

3. In combination in a mechanical warp stop motion for weaving looms and the like, drops, fixed and movable serrated drop bars, a shipper device, a connection between the motion and the shipper device, a constantly moving actuator, a moving part adapted during the normal operation of the motion to miss the constantly moving actuator but on the fall of a drop to be held in alinement with the constantly moving actuator and means carried by said moving part for operating the connection between the motion and the shipper device, substantially as described 4. In combination in a mechanical warp stop motion for weaving looms and the like, drops, fixed and movable serrated drop bars, a constantly moving actuator, a rocking lever connected with the movable serrated bar or bars, means whereby the rocking lever is normally operated so as to miss contact with the constantly moving actuator, a part carried by the rocking lever and held in line with the actuator on the stopping of the movable bar or bars, a shipper device and a connection between the part carried by the rocking lever and the shipper device for operating the latter, substantially as described.

5. In combination in a mechanical warp stop motion for weaving looms and the like, drops, fixed and movable serrated drop bars, a continuously rotating horizontal shaft, a vertical rock shaft, a rocking lever connected with the movable serrated drop bar or bars, a connection between the rock shaft and the rocking lever for operating the latter, a cam on the horizontal shaft, a sliding rod carried by the rocking lever and arranged to be operated by the cam when held in alinement therewith, a shipper device and means for transmitting the movement of the sliding rod thereto, substantially as described.

6. In combination in a mechanical warp stop motion for weaving looms and the like, drops, fixed and movable serrated drop bars, a continuously rotating horizontal shaft, a cam on the horizontal shaft, a vertical rock shaft, a rocking lever, flexible arms for actuating said rocking lever from the vertical rock shaft, a latch connecting the rocking lever with the movable serrated drop bar or bars, a sliding rod carried by the rocking lever, a pivoted plate or lever located above the sliding rod, a shipper lever, a notched holding device therefor, a trigger adapted to disengage the shipper lever and a flexible connection between the plate or lever above the sliding rod and the trigger, substantially as described.

7. In a mechanical warp stop motion for weaving looms and the like comprising drops and fixed and movable serrated drop bars, a framing or support containing the parts of the motion proper and provided with a curved slotted horn or horns for carrying the drop bars, substantially as described.

In testimony whereof we have signed our names to this specification in the presence of two subscribing witnesses.

JOHN TAYLOR.
EDWIN WILLIAM BUCKLEY.

Witnesses:
JAMES LIVSEY,
ERNEST HEWITT.